(12) United States Patent
Schwab et al.

(10) Patent No.: US 7,805,494 B1
(45) Date of Patent: Sep. 28, 2010

(54) SYSTEM FOR TRANSFERRING DESKTOP COMPUTER CONFIGURATION

(76) Inventors: Barry H. Schwab, 5298 Cedarhurst Dr., West Bloomfield, MI (US) 48322; John G. Posa, 1204 Harbrooke Ave., Ann Arbor, MI (US) 48103

( * ) Notice: Subject to any disclaimer, the term of this patent is extended or adjusted under 35 U.S.C. 154(b) by 2607 days.

(21) Appl. No.: 09/877,597

(22) Filed: Jun. 8, 2001

Related U.S. Application Data

(60) Provisional application No. 60/210,879, filed on Jun. 9, 2000.

(51) Int. Cl.
*G06F 15/167* (2006.01)

(52) U.S. Cl. ............... 709/213; 709/220; 709/221; 709/222; 717/176; 713/100

(58) Field of Classification Search ......... 709/220–222, 709/201, 208, 209, 226, 229, 232; 713/2, 713/100; 717/174, 175, 176, 177, 178, 168, 717/169, 170, 171, 172, 173
See application file for complete search history.

(56) References Cited

U.S. PATENT DOCUMENTS

| | | | | |
|---|---|---|---|---|
| 5,241,659 A * | 8/1993 | Parulski et al. | ............... | 345/589 |
| 6,029,196 A * | 2/2000 | Lenz | ............... | 709/221 |
| 6,145,126 A * | 11/2000 | Matsukura et al. | ............... | 717/173 |
| 6,237,022 B1 * | 5/2001 | Bruck et al. | ............... | 709/201 |
| 6,339,826 B2 * | 1/2002 | Hayes et al. | ............... | 713/166 |
| 6,512,526 B1 * | 1/2003 | McGlothlin et al. | ............... | 715/762 |
| 6,636,857 B2 * | 10/2003 | Thomas et al. | ............... | 707/10 |
| 6,654,797 B1 * | 11/2003 | Kamper | ............... | 709/220 |
| 6,718,464 B2 * | 4/2004 | Cromer et al. | ............... | 713/2 |
| 6,795,835 B2 * | 9/2004 | Ricart et al. | ............... | 1/1 |
| 7,441,108 B2 * | 10/2008 | Fisher et al. | ............... | 712/227 |
| 2002/0147912 A1 | 10/2002 | Shmueli et al. | ............... | 713/182 |

* cited by examiner

*Primary Examiner*—Thuha T. Nguyen
*Assistant Examiner*—Lashanya R Nash
(74) *Attorney, Agent, or Firm*—Gifford, Krass, Sprinkle, Anderson & Citkowski, P.C.

(57) ABSTRACT

A method of transferring user preferences from one computer to another is based upon a transportable data storage medium. Information relating to the user's computer configuration preferences are recorded on the medium at a first computer, which is then loaded at a second computer, so as to at least temporarily configure the second computer in accordance with the information stored on the transportable medium. The information stored on the medium may effectuate various configuration changes at the second computer, including the generation of a preferred desktop graphical interface. The storage medium may also include information relating to wired or wireless network or dial-up communications preferences, application programs, one or more user files or information relating thereto. The method may further include the step of accessing a remote location to at least temporarily configure the second computer in accordance with the information stored on the transportable medium. For example, a remote location may be accessed to download data or an application program desired by the user at the second computer. The configuration of the second computer may occur by re-booting the second computer or through a different user log-on without restarting the second computer. The medium may be based on magnetic, optical, magneto-optical, or semiconductor storage, and may be in the form of a disk or card.

1 Claim, 1 Drawing Sheet

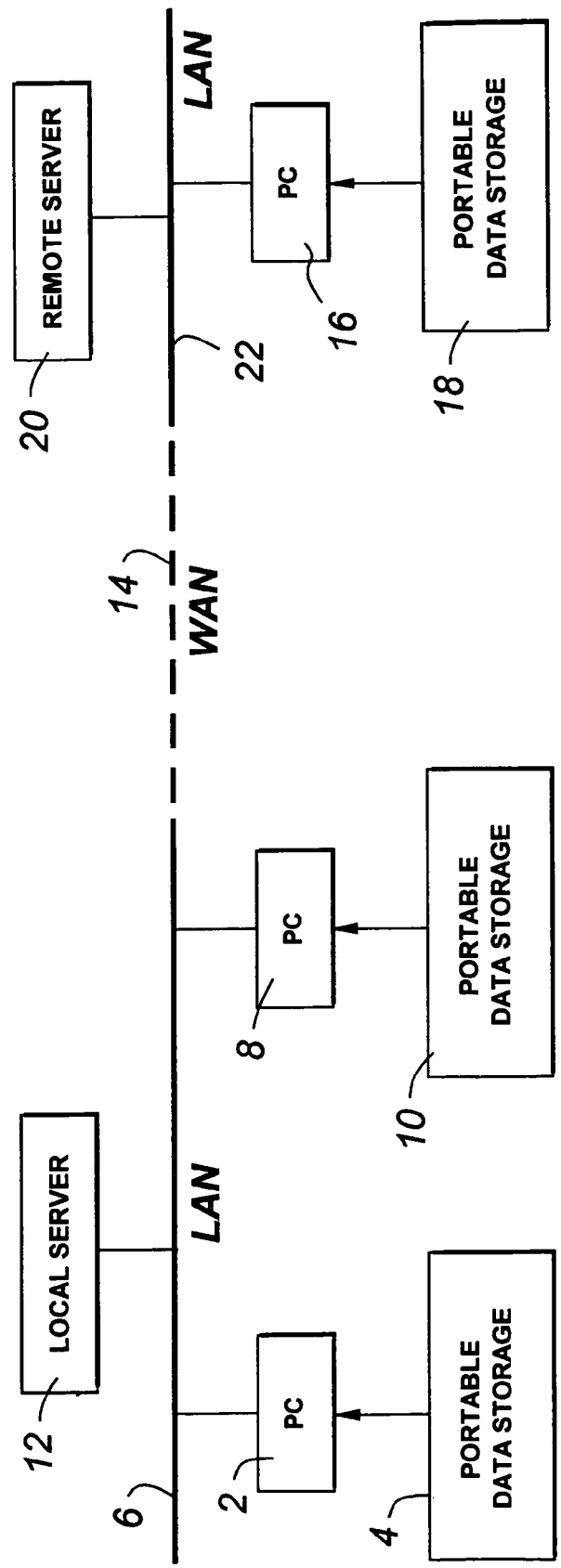

SYSTEM FOR TRANSFERRING DESKTOP COMPUTER CONFIGURATION

REFERENCE TO RELATED APPLICATION

This application claims priority from U.S. provisional patent application Ser. No. 60/210,879, filed Jun. 9, 2000, the entire contents of which are incorporated herein by reference.

FIELD OF THE INVENTION

This invention relates to personal computers, and, more particularly, to a system for conveying personal customizing information from one computer to another computer as desired.

BACKGROUND OF THE INVENTION

A fact of life in today's business and personal activities is the pervasive presence of computers. Unfortunately, as a user customizes a computer to optimize his productivity, he also makes it more difficult to use another computer, one which may be optimized for the preferences of a different user. In a similar vein, he also makes it more difficult for anyone else to use his computer. Microsoft Windows software allows multiple users to each customize the appearance of the desktop graphical interface and software applications, based on their individual log-in identification, and on customizing files stored on each computer. However, although this customizing information also may be stored on a central server computer as part of a networked system, only computers that are physically connected to the central server computer can access this customizing information. In general, the customizing information is transmitted as part of the log-on sequence, and therefore cannot be applied through a dial-in connection.

SUMMARY OF THE INVENTION

This invention resides in a method of transferring user preferences from one computer to another using a transportable data storage medium. Information relating to the user's computer configuration preferences are recorded on the transportable data storage medium at a first computer. The transportable data storage medium is then loaded at a second computer, thereby at least temporarily configuring the second computer in accordance with the information stored on the transportable medium.

The information stored on the medium may effectuate various configuration changes at the second computer, including the generation of a preferred desktop graphical interface. The storage medium may also include information relating to wired or wireless network or dial-up communications preferences, application programs, one or more user files or information relating thereto.

The method may further include the step of accessing a remote location to at least temporarily configure the second computer in accordance with the information stored on the transportable medium. For example, a remote location may be accessed to download data or an application program desired by the user at the second computer.

The configuration of the second computer may occur by re-booting the second computer or through a different user log-on without restarting the second computer. The medium may be based on magnetic, optical, magneto-optical, or semiconductor storage, and may be in the form of a disk or card.

The user is preferably prompted to retain the storage medium following the reconfiguration of second machine, and user files stored on the storage medium are updated in accordance with the use of the second computer.

BRIEF DESCRIPTION OF THE DRAWINGS

FIG. 1 shows many of the various possible implementations of the invention.

DETAILED DESCRIPTION OF THE INVENTION

The system contemplates one or more data files residing on a transportable storage medium, such that when this data is supplied to a personal computer or other electronic device, the device will be configured to reflect the preferences of that user. In practice, the data files may contain a variety of information, including configuration of the operating characteristics of the electronic apparatus, desktop graphical interface configuration for a PC, configuration information for wired or wireless networked connections or for dial-in connections, specific personal files for reference use or that are being utilized and/or modified on a temporary basis, or individual commercial or personal application software that is licensed to the user.

The transportable medium may be comprised of any form of data storage, including, but not limited to, semiconductor, magnetic, optical, or magneto-optical devices. As an alternative, the information may be downloaded to a personal computer through a network connection (wired, wireless, or dial-in), along with software to load the data when the computer restarts or refreshes its settings.

FIG. 1 shows many features of the possible implementations of the invention. A first personal computer 2 has been configured in a manner which is convenient for a particular user. By employing a transportable data storage medium 4, this user has the capability to store many aspects of those characteristics that make the PC 2 unique: the desktop configuration, the configuration of various software programs, electronic mail service configuration, security access passwords, particular data files, and so forth. For example, in the Windows95 operating system, much of the configuration information is stored within the User Profile, and in the Registry settings for that User Profile. In addition, particular data files, such as work files, databases, and other useful files may be included under the definition of this user configuration information.

As an alternative, the user configuration information may be stored on another computer, such as a local server computer 12 connected over a local area network ("LAN") 6, or on a remote server computer 20, where this information would be accessed over a wide area network ("WAN") 14 such as a dial-up network, a hard-wired connection, a wireless connection, or an Internet access provider. In these cases, the user configuration information would available to a second PC 8 via the local area network, or a third PC 16 over a wide area network. Additional PCs (not shown) located remotely from the first PC, would be enabled to access user configuration information located on server computer 12 over a wide area network connection, or located on server computer 20, via a remotely located local area network, shown as 22.

When the transportable data storage medium is relocated to the second PC 8, it may be physically connected to that computer, thereby making its user configuration information locally available, as shown as 10. When the transportable data storage medium is relocated to remotely located PC 16, it may be physically connected to that computer, thereby making its user configuration information locally available, as shown as 18.

Personal computers participating in the system of transporting the desktop configuration by utilizing a transportable data storage medium or via a local or wide-are network connection preferably would have custom software embedded in the operating system to enable selection, either manually or automatically, of the source for the configuration information. For example, the operating system could be configured to look for alternative user configuration information in a predetermined manner, and then turn to the default user configuration information stored locally on the PCs hard disk drive. This approach would be analogous to that typically employed for a PC at boot-up time, in which the PC looks first for a medium in the floppy-disk drive, then, if one is present, looks for operating system boot-up components on that floppy-disk drive, and finally looks for these operating system boot-up components on the local hard-disk drive. Alternatively, a separate software program, run at boot-up time, would allow the user to select the source of the user configuration information.

In another implementation, the transportable data storage medium would include the license file information for various applications. This would enable the user, for example, to install a software package on his work computer, his home computer, and his portable computer, and yet still operate within the limitations of his software license by utilizing the transportable data storage medium to ensure that only one computer at a time is using the software. For example, the installation of the license file onto the transportable data storage medium may be accomplished as part of the customary software installation process using locally-available media, by way of a download over a local area network, or by way of a download over a wide area network, such as the Internet. The transportable data storage medium would not be limited to storing a single license file for a single computer, but instead would be able to store a range of license files for a variety of computers employed by the user. Versions of software programs having minimal or restricted features could be implemented on a temporary basis on any machine, by carrying a limited version of that software within the transportable data storage medium.

In the typical application, a user would activate his customized configuration by providing the customizing information on the transportable medium. This could be a floppy disk, or a "credit card" plug-in storage device. Upon start-up, the file data would be read by the PC operating system (for example, Windows95), and utilized for the initial configuration. As an alternative, the stored configuration information may be read when the operating system software is placed in "Log on as a different user" mode, which would effect the reconfiguration without the need to reboot the PC. When the user ends his session, he is prompted to decide whether to update his transportable medium, and reminded to remove the transportable medium when he leaves the PC.

We claim:

1. A method of transferring user preferences from one computer to another, comprising the steps of:

providing a transportable data storage medium;

recording on the transportable data storage medium, at a first computer, a user's unique information relating to the particular user's computer configuration preferences, including information relating to the user's preferred desktop graphical interface;

receiving the transportable data storage medium at a second computer;

accessing the user's unique information from the transportable data storage medium at the second computer;

at least temporarily configuring the second computer in accordance with the information accessed from the transportable data storage medium;

updating the user's unique information in accordance with the use of the second computer; and storing the updated user's unique information on the transportable data storage medium.

* * * * *